US011165926B1

(12) United States Patent
Osada (10) Patent No.: US 11,165,926 B1
(45) Date of Patent: Nov. 2, 2021

(54) IMAGE FORMING APPARATUS, INFORMATION PROCESSING METHOD, AND NON-TRANSITORY COMPUTER READABLE RECORDING MEDIUM THAT STORES INFORMATION PROCESSING PROGRAM

(71) Applicant: KYOCERA DOCUMENT SOLUTIONS INC., Osaka (JP)

(72) Inventor: Yoshihiro Osada, Concord, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 17/037,818

(22) Filed: Sep. 30, 2020

(51) Int. Cl.
*H04N 1/04* (2006.01)
*H04N 1/10* (2006.01)
*H04N 1/387* (2006.01)
*H04N 1/00* (2006.01)
*H04N 1/393* (2006.01)

(52) U.S. Cl.
CPC ......... *H04N 1/1043* (2013.01); *H04N 1/0066* (2013.01); *H04N 1/3873* (2013.01); *H04N 1/393* (2013.01)

(58) Field of Classification Search
None
See application file for complete search history.

(56) References Cited

U.S. PATENT DOCUMENTS

| 5,726,775 A * | 3/1998 | Walsh | H04N 1/00013 355/25 |
| 5,835,241 A * | 11/1998 | Saund | H04N 1/387 358/488 |
| 8,159,721 B2 * | 4/2012 | Lee | H04N 1/387 358/3.26 |
| 9,924,066 B2 | 3/2018 | Takahashi et al. | |
| 2011/0317195 A1 * | 12/2011 | Mitsui | H04N 1/00411 358/1.13 |
| 2012/0194880 A1 * | 8/2012 | Muroi | H04N 1/00822 358/474 |
| 2015/0317784 A1 * | 11/2015 | Oshima | G06K 9/00355 348/54 |
| 2016/0105579 A1 * | 4/2016 | Kamisoyama | H04N 1/00708 358/1.5 |
| 2020/0195802 A1 * | 6/2020 | Moro | H04N 1/0084 |

* cited by examiner

*Primary Examiner* — Dung D Tran
(74) *Attorney, Agent, or Firm* — Li & Cai Intellectual Propery (USA) Office (57) ABSTRACT

An image forming apparatus includes: a platen optically-transparent; a line sensor configured to move below the platen and optically scan the platen; an image-capturing device located below the platen and configured to capture a viewpoint area, the viewpoint area being at least a partial area on the platen and being an area expected to include at least a part of an edge of a document where the document is put on the platen with reference to a reference position on the platen; a display device; and a controller circuitry configured to display a viewpoint image and a guideline image on the display device, the viewpoint image being an image obtained by capturing the viewpoint area by the image-capturing device, the guideline image being an image showing the reference position, such that the guideline image overlaps the reference position in the viewpoint area included in the viewpoint image.

20 Claims, 6 Drawing Sheets

IMAGE FORMING APPARATUS, INFORMATION PROCESSING METHOD, AND NON-TRANSITORY COMPUTER READABLE RECORDING MEDIUM THAT STORES INFORMATION PROCESSING PROGRAM

FIELD OF THE DISCLOSURE

The present disclosure relates to an image forming apparatus including an optically-transparent platen and a line sensor configured to move below the platen and optically scan the platen or a document on the platen. The present disclosure relates to an information processing method, and a non-transitory computer readable recording medium that stores information processing program executable by the image forming apparatus.

BACKGROUND OF THE DISCLOSURE

There is known an image forming apparatus including an optically-transparent platen and a line sensor configured to move below the platen and optically scan the platen or a document on the platen.

SUMMARY OF THE DISCLOSURE

According to an embodiment of the present disclosure, there is provided an image forming apparatus, including:
a platen optically-transparent;
a line sensor configured to move below the platen and optically scan the platen;
an image-capturing device located below the platen and configured to capture a viewpoint area, the viewpoint area being at least a partial area on the platen and being an area expected to include at least a part of an edge of a document where the document is put on the platen with reference to a reference position on the platen;
a display device; and
a controller circuitry configured to display a viewpoint image and a guideline image on the display device, the viewpoint image being an image obtained by capturing the viewpoint area by the image-capturing device, the guideline image being an image showing the reference position, such that the guideline image overlaps the reference position in the viewpoint area included in the viewpoint image.

According to an embodiment of the present disclosure, there is provided an information processing method executable by an image forming apparatus including
a platen optically-transparent,
a line sensor configured to move below the platen and optically scan the platen,
an image-capturing device located below the platen and configured to capture a viewpoint area, the viewpoint area being at least a partial area on the platen and being an area expected to include at least a part of an edge of a document where the document is put on the platen with reference to a reference position on the platen, and
a display device,
the information processing method including:
displaying a viewpoint image and a guideline image on the display device, the viewpoint image being an image obtained by capturing the viewpoint area by the image-capturing device, the guideline image being an image showing the reference position, such that the guideline image overlaps the reference position in the viewpoint area included in the viewpoint image.

According to an embodiment of the present disclosure, there is provided a non-transitory computer readable recording medium that stores an information processing program executable by an image forming apparatus including
a platen optically-transparent,
a line sensor configured to move below the platen and optically scan the platen,
an image-capturing device located below the platen and configured to capture a viewpoint area, the viewpoint area being at least a partial area on the platen and being an area expected to include at least a part of an edge of a document where the document is put on the platen with reference to a reference position on the platen,
a display device, and
a controller circuitry,
the information processing program causing the controller circuitry of the image forming apparatus to:
display a viewpoint image and a guideline image on the display device, the viewpoint image being an image obtained by capturing the viewpoint area by the image-capturing device, the guideline image being an image showing the reference position, such that the guideline image overlaps the reference position in the viewpoint area included in the viewpoint image.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

I. First Embodiment

Figure 1:
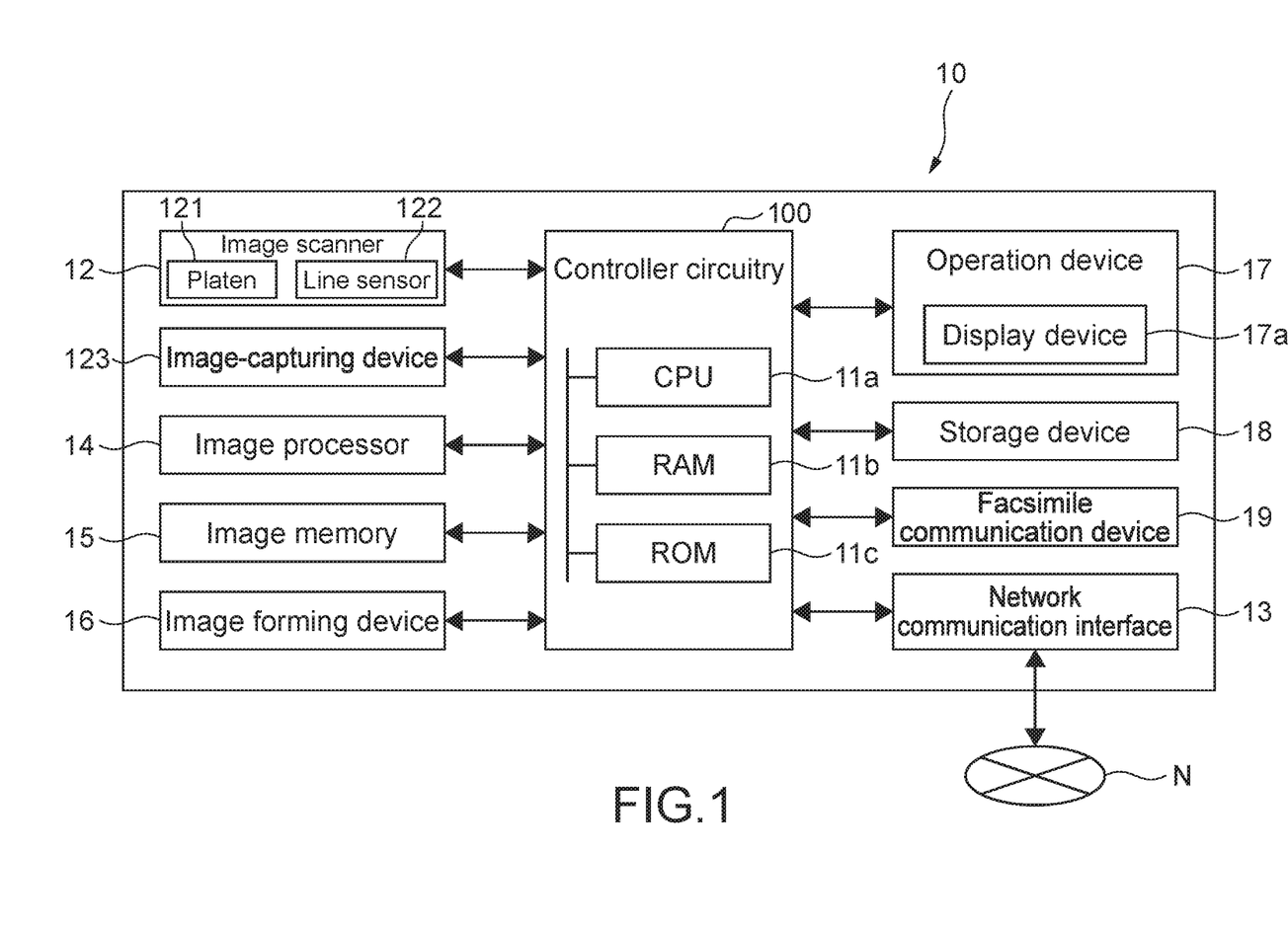
FIG. 1 shows a hardware configuration of an image forming apparatus.

1. Hardware Configuration of Image Forming Apparatus
FIG. 1 shows a hardware configuration of an image forming apparatus.
The image forming apparatus 10 is, for example, an MFP (Multifunction Peripheral). The image forming apparatus 10 includes the controller circuitry 100. The controller circuitry 100 includes the CPU (Central Processing Unit) 11a, the RAM (Random Access Memory) 11b, the ROM (Read Only Memory) 11c, dedicated hardware circuits, and the like and performs overall operational control of the image forming apparatus 10. The CPU 11a loads information processing programs (including image processing program) stored in the ROM 11c in the RAM 11b and executes the information processing programs. The ROM 11c is a nonvolatile memory that stores programs executable by the CPU 11a, data, and the like. The ROM 11c is an example of a non-transitory computer readable recording medium.

The controller circuitry 100 is connected to the image scanner 12, the image-capturing device 123, the image processor 14 (including GPU (Graphics Processing Unit)), the image memory 15, the image forming device 16 (printer device), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuitry 100 performs operational control of the respective devices connected thereto and sends/receives signals and data to/from those devices. The operation device 17 including the display device 17a (touch panel) is one mode of an input device. A sound input device including a microphone may be provided as an input device.

The image scanner 12 includes the optically-transparent platen 121 and the line sensor 122. A document to be scanned is put on the platen 121. The line sensor 122 moves below the platen 121 in the long-side direction (vertical scan direction) and optically scans the platen 121.

In a typical image forming apparatus, the reference position on the platen, on which a document is put, is the top left corner (rear left corner). To the contrary, in the present embodiment, for example, the reference position on the platen 121 is the center point of the platen 121 (center point of rectangular shape). A user puts a document on the platen 121 such that the center point of the document aligns with the center point (reference position) of the platen 121. For example, a user puts an open book (document) on the platen 121 such that the binding line (center line) of the open book (document) aligns with the center line of the platen 121 (line in the short-side direction (horizontal scan direction) that divides the platen 121 into two equal parts in the long-side direction (vertical scan direction)) and such that the center point of the binding line (center line) of the open book (document) aligns with the center point of the center line of the platen 121. For example, guides showing the reference position (center point in the vertical scan direction, and center point of the horizontal scan direction) are added onto the bezel of the platen 121.

The image-capturing device 123 is positioned below the platen 121, and captures a viewpoint area. The viewpoint area is at least a partial area on the platen 121 (the platen 121 on which a document is put), and obtains an image (viewpoint image). The viewpoint area is an area expected to include at least a part of an edge (outline) of a document where the document is put on the platen 121 with reference to a reference position on the platen 121. In other words, where a document is put on the optically-transparent platen 121, the viewpoint image includes a part of the edge of the document, and a part of the platen 121 on which the document is not put. In the present embodiment, viewpoint areas are, where a document is put on the platen 121 with reference to the reference position on the platen 121 (i.e., such that the center point of the document aligns with the center point (reference position) of the platen 121), two areas including an area including the edge of the document (book) including the upper end of the center line (binding line of book) of the document, and an area including the edge of the document (book) including the lower end of the center line (binding line of book) of the document. Documents have various sizes. So the two viewpoint areas have sizes and positions such that the two viewpoint areas include upper end edges and lower end edges of documents (print paper, open book, etc.) of typical various sizes where the documents of the typical various sizes are put with reference to the reference position (center point) of the platen 121.

The image-capturing device 123 may have any hardware and any software as long as the image-capturing device 123 is capable of focusing on the two viewpoint areas on the platen 121 and capturing their images. For example, the image-capturing device 123 is/are a camera/cameras. The image-capturing device 123 may be one camera including one lens. The image-capturing device 123 may be one camera including multiple lenses and fiber components. The image-capturing device 123 may be a shared image-capturing device also used by the image scanner 12. As long as the image-capturing device 123 is capable of capturing at least all the two viewpoint areas on the platen 121, in other words, the image-capturing device 123 may capture the entire area (including all viewpoint areas) on the platen 121. The image-capturing device 123 is provided such that the image-capturing device 123 does not block the optical system of the image scanner 12. For example, the image-capturing device 123 includes multiple cameras provided such that the multiple cameras do not optically and physically block the image scanner 12, and generate composite images from images captured by the multiple cameras to thereby generate the viewpoint images. The image-capturing device 123 may have a fisheye lens, capture an image of a wide area, and correct distortion of the image to thereby generate the viewpoint images. Since the viewpoint images are only used for alignment (described later), the image-capturing device 123 may capture low-resolution viewpoint images and/or black-and-white viewpoint images. Alternatively, the image-capturing device 123 may not include a camera. The image-capturing device 123 may be a secondary scanner device independent of the image scanner 12, i.e., the primary scanner device. Also in the case where the image-capturing device 123 is not a camera but a secondary scanner device, as long as the image-capturing device 123 is capable of focusing on the two viewpoint areas on the platen 121 and capturing their images, the image-capturing device 123 may capture low-resolution viewpoint images and/or black-and-white viewpoint images.

2. Functional Configuration of Image Forming Apparatus

Figure 2:
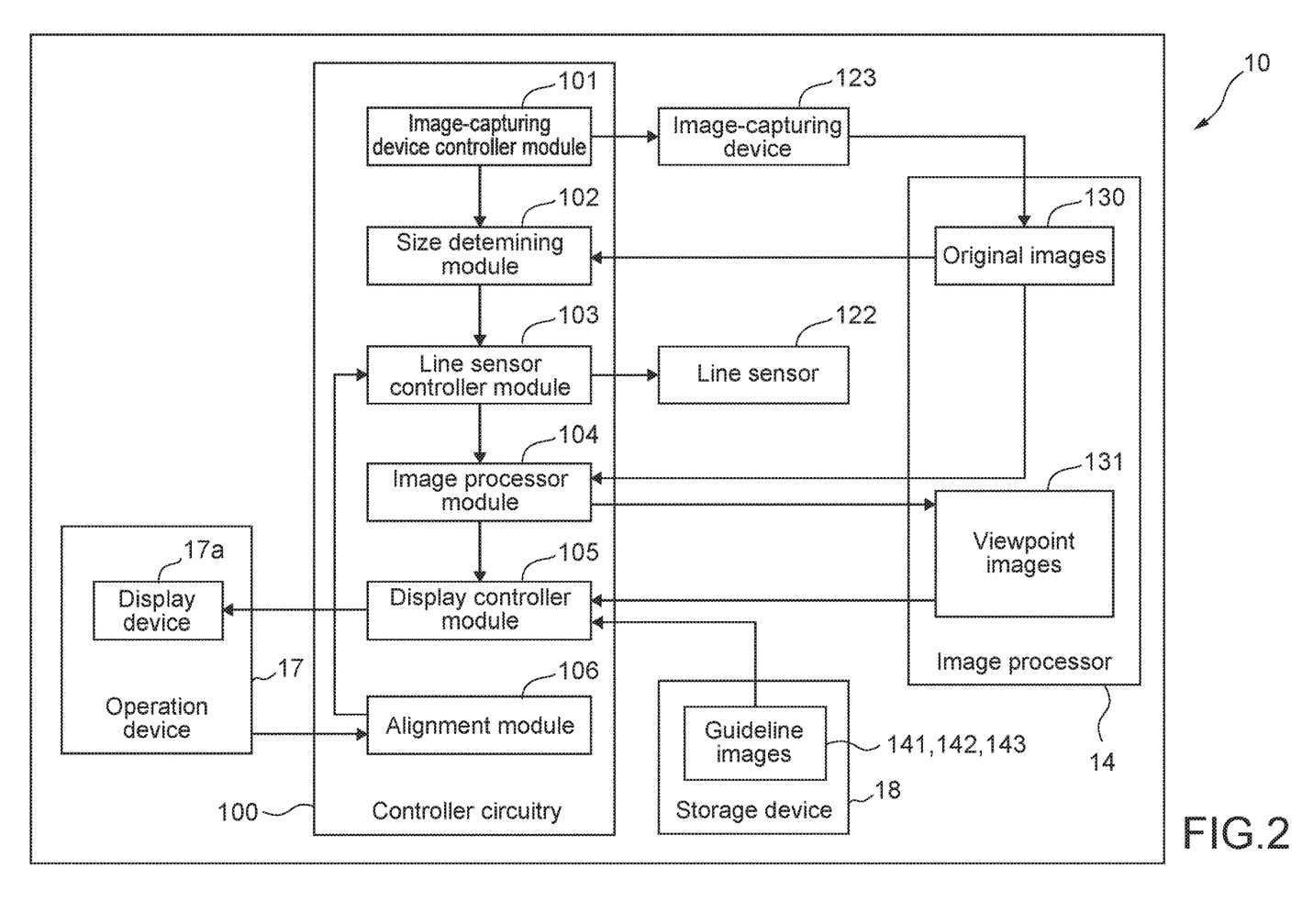
FIG. 2 is a functional configuration of the image forming apparatus.

FIG. 2 is a functional configuration of the image forming apparatus.

In the controller circuitry 100 of the image forming apparatus 10, the CPU 11a loads an information processing program stored in the ROM 11c in the RAM 11b and executes the image processing program to operate as the image-capturing device controller module 101, the size determining module 102, the line sensor controller module 103, the image processor module 104, the display controller module 105, and the alignment module 106.

3. Operational Flow of Image Forming Apparatus

Figure 3:
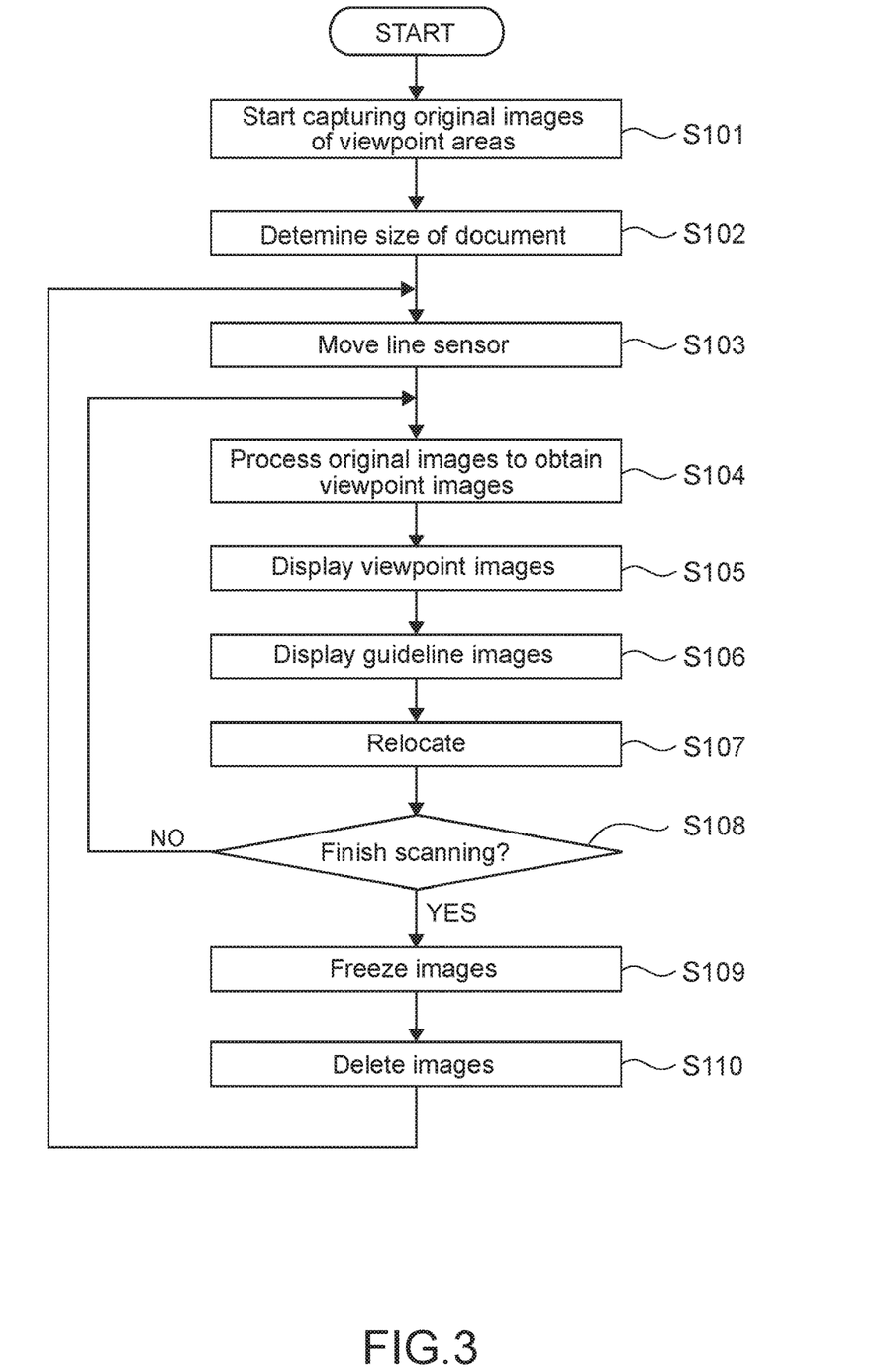
FIG. 3 shows an operational flow of the image forming apparatus.

FIG. 3 shows an operational flow of the image forming apparatus.

A user puts on a document on the platen 121 with reference to the reference position on the platen 121. In the present embodiment, a user puts a document (open book) on the platen 121 such that the center point (center point of binding line, i.e., center line) of the document (open book) aligns with the center point (reference position) of the platen 121.

Figure 4:
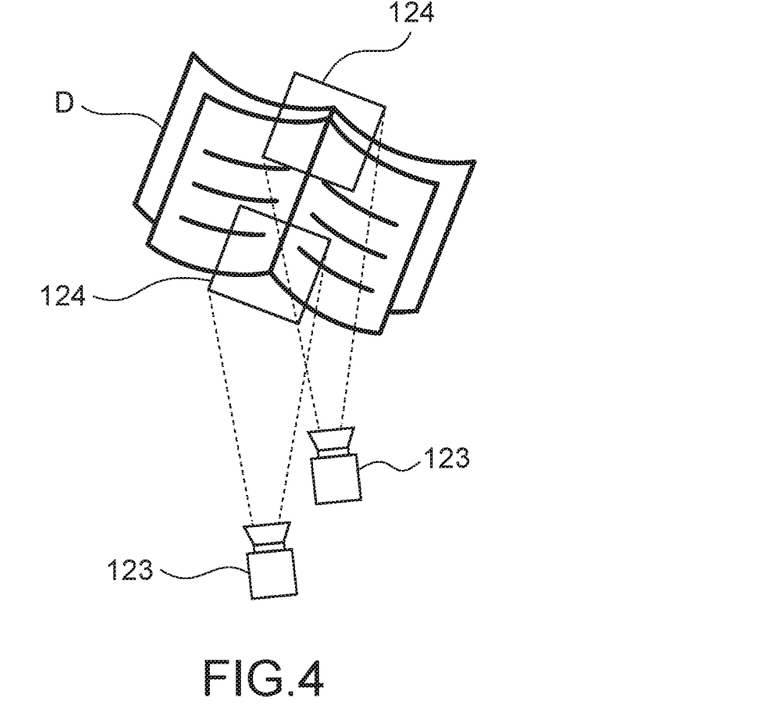
FIG. 4 schematically shows viewpoint areas captured by the image-capturing device.

FIG. 4 schematically shows viewpoint areas captured by the image-capturing device.

The image-capturing device controller module 101 starts capturing the two viewpoint areas 124 on the platen 121 by using the image-capturing device 123, and starts obtaining the original images 130 (Step S101). The image-capturing device 123 continuously captures the two viewpoint areas 124 on the platen 121 (not shown in FIG. 4) on which the document D is put, and keeps on recording the original images 130 (i.e., video images).

The size determining module 102 determines the size of the document (Step S102). The size determining module 102 may optically determine the size of the document. For example, the size determining module 102 may estimate the size of the document based on the positions in the short-side direction (horizontal scan direction) of the edges of the document included in the original images 130. Alternatively, the size determining module 102 may obtain a value input in the operation device 17 by a user as the size of the document.

The line sensor controller module 103 moves the line sensor 122 to a different home position depending on the size of the document (Step S103). In a typical image forming apparatus, the reference position on the platen, on which a document is put, is the top left corner (rear left corner). So the home position (in other words, document edge) of a line sensor in the long-side direction (vertical scan direction) is the left end irrespective of sizes of documents. To the contrary, in the present embodiment, the reference position on the platen 121 is the center point of the platen 121. Therefore the home position (in other words, document edge) of the line sensor 122 depends on sizes of documents. Specifically, as the size of the document is larger, the home position of the line sensor 122 is closer to the left end of the platen 121. To the contrary, as the size of the document is smaller, the home position of the line sensor 122 is closer to the center point of the platen 121.

The image processor module 104 processes the original images 130. For example, the image processor module 104 removes noise such as shades, which results from floating of the binding line, from the original images 130, and thereby converts the original images 130 into flat images. Further, the image processor module 104 clips parts, which only include parts close to the edges of the documents, from the original images 130, and thus magnifies the clipped images. As a result, the image processor module 104 generates the viewpoint images 131 from the original images 130 by image processing. The image processor module 104 continuously processes the original images 130, which are continuously captured, and keeps on recording the viewpoint images 131 (i.e., video images) (Step S104). Note that the original images 130 may be used as the viewpoint images 131 as they are without being processed (i.e., flattening, clipping, and magnifying).

Figure 5:
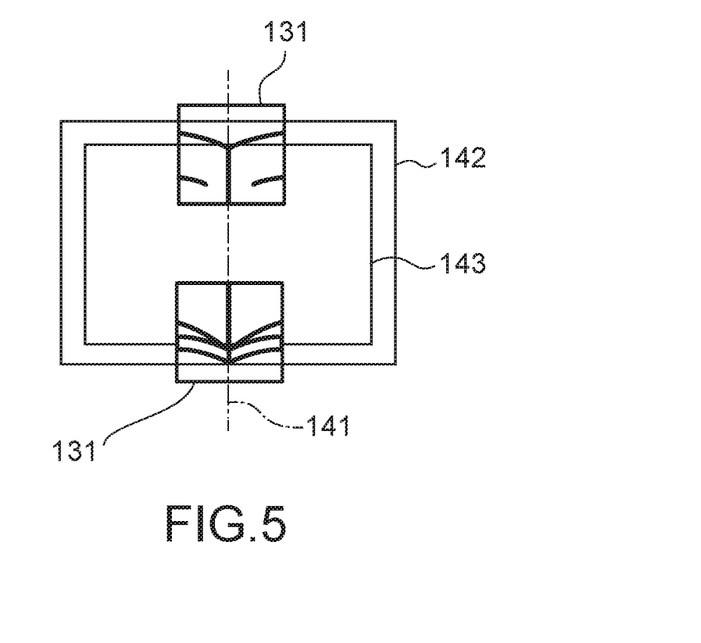
FIG. 5 schematically shows viewpoint images and guideline images displayed on the display device.

FIG. 5 schematically shows viewpoint images and guideline images displayed on the display device.

The display controller module 105 keeps on displaying the viewpoint images 131 (i.e., video images) on the display device 17*a* (Step S105). The display controller module 105 further displays guideline images on the display device 17*a* (Step S106). A guideline image shows the reference position on the platen 121. The center line image 141, which is a guideline image, shows the center line of the platen 121, which is the most important as a reference for putting a document on the platen 121. The display controller module 105 displays the viewpoint images 131 and the center line image 141 (guideline image) such that the center line image 141 (guideline image) overlaps (overlays) the reference positions in the viewpoint areas included in the viewpoint images 131. Specifically, where the center line (binding line) of the document put on the platen 121 completely aligns with the center line of the platen 121, the center line image 141 (guideline images) completely overlaps the center line (binding line) of the document included in the viewpoint images 131. Meanwhile, where the center line (binding line) of the document put on the platen 121 is misaligned with the center line of the platen 121, the displayed center line image 141 (guideline images) is misaligned with the center line (binding line) of the document included in the viewpoint images 131. The guideline images further include the limit line image 142 and the margin line image 143. The limit line image 142 shows the physical limit line (optically readable limit) of the edge of a document, which may serve as a reference for putting a document on the platen 121. The margin line image 143 shows a margin line showing the limit line (effective readable limit for content such as sentences in document) of content in a document. The display controller module 105 further displays the limit line image 142 and the margin line image 143 such that the limit line image 142 and the margin line image 143 overlap the reference positions (limit line and margin line) on the platen 121. Note that the guideline image(s) may include the center line image 141, the limit line image 142, and/or the margin line image 143 (three of them, any two of them, or any one of them). In the present embodiment, the guideline images include all of the center line image 141, the limit line image 142, and the margin line image 143.

With reference to the display device 17*a*, a user manually relocates a document where the document put on the platen 121 is misaligned with the reference position. When the user is relocating the document, also, the display controller module 105 keeps on displaying the viewpoint images 131 and the guideline images (the center line image 141, the limit line image 142, and the margin line image 143) as video images. The user adjusts the position of the document such that the center line image 141 (guideline images) completely overlaps the center line (binding line) of the document included in the displayed viewpoint images 131.

Alternatively, a user inputs, via the operation device 17, an operation (for example, drag and drop operation on touch panel) for relocating the guideline images (the center line image 141, the limit line image 142, and the margin line image 143) with respect to the viewpoint images 131. The alignment module 106 displays the guideline images (the center line image 141, the limit line image 142, and the margin line image 143) on positions, which are relocated with respect to the viewpoint images 131, in response to the input operation. The user inputs, via the operation device 17, an operation for finishing relocating the guideline images (the center line image 141, the limit line image 142, and the margin line image 143). The alignment module 106 notifies the line sensor controller module 103 of the new reference position, i.e., the position on the platen 121 which the relocated guideline images (the center line image 141, the limit line image 142, and the margin line image 143) overlap. The line sensor controller module 103 relocates the line sensor 122 to the home position depending on the size of the document and the new reference position (Step S107). As a result, without physically relocating the document, the document is substantially put on the platen 121 with reference to reference position on the platen 121.

The user finishes adjusting the position of the document on the platen 121, and then requests to start scanning via the operation device 17. The line sensor controller module 103 scans the document put on the platen 121, and thereby obtains an image (scanned image). At the time when the line sensor controller module 103 finishes scanning (Step S108, YES), the image processor module 104 finishes updating the viewpoint images 131 (i.e., freezes the viewpoint images 131). The display controller module 105 displays the finally-frozen viewpoint images 131 and the finally-frozen guideline images (the center line image 141, the limit line image 142, and the margin line image 143) on the display device 17a such that they overlap one another (Step S109). As a result, the user may visually confirm that the document is at a correct position with reference to the reference position of the platen 121 until the scanning is completed.

The user inputs a request to output (store or abandon, etc.) the scanned image via the operation device 17. Then the image processor module 104 deletes the original images 130 and the viewpoint images 131 from the memory, and finishes displaying the viewpoint images 131 (Step S110). Where the home position of the line sensor 122 was relocated (Step S107), the alignment module 106 returns the line sensor 122 to the home position depending on the size of the document. Then the user puts a next document (next page where document is book) on the platen 121. The image forming apparatus 10 repeats the process of Step S103 and thereafter.

II. Second Embodiment

Hereinafter, components and operations similar to the components and operations already described will not be described and not shown in the figures, and different components and operations will be described mainly.

Figure 6:
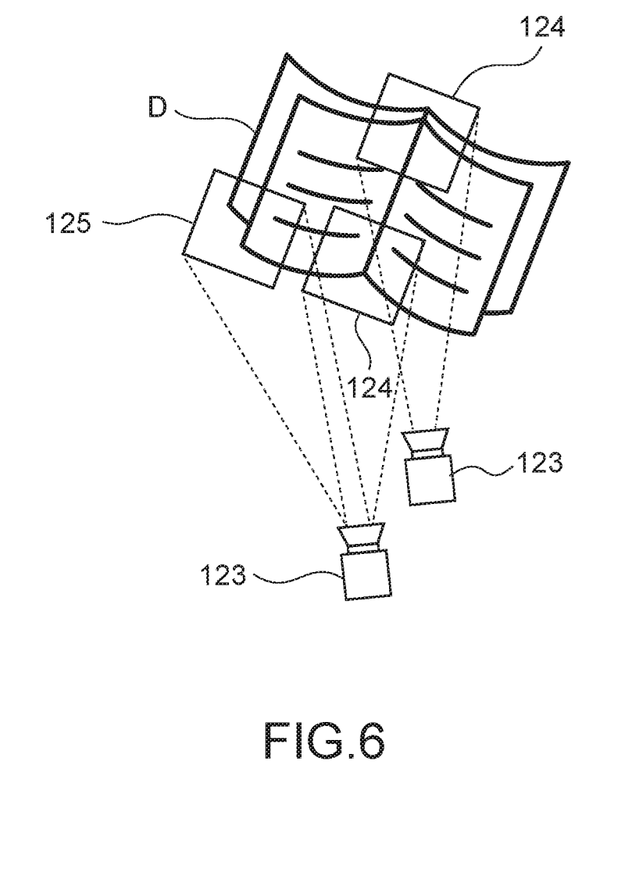
FIG. 6 schematically shows a page number area and viewpoint areas captured by the image-capturing device.

The image-capturing device 123 captures one page number area in addition to the two viewpoint areas on the platen 121. The page number area is an area expected to include at least a page number (page number of one of two open pages) of the document where the document is put on the platen 121 with reference to the reference position (center point of the platen 121) on the platen 121. The image-capturing device 123 captures the page number area, which is at least a partial area on the platen 121 (the platen 121 on which document is put), and obtains an image (page number image). The page number image has a resolution and a size, with which a page number value is readable. The image-capturing device 123 may have any hardware and any software as long as the image-capturing device 123 is capable of focusing on the two viewpoint areas and the one page number area on the platen 121 and capturing their images.

FIG. 6 schematically shows a page number area and viewpoint areas captured by the image-capturing device.

The image-capturing device controller module 101 starts capturing the two viewpoint areas 124 and the one page number area 125 on the platen 121 by using the image-capturing device 123, and starts obtaining the original images 130 (Step S101). The image-capturing device 123 continuously captures the two viewpoint areas 124 and the one page number area 125 on the platen 121 (not shown in FIG. 6) on which the document D is put, and keeps on recording the original images 130 (i.e., video images). The image processor module 104 continuously processes the original images 130, which are continuously captured, and keeps on recording the viewpoint images 131 and the page number image 132 (i.e., video images) (Step S104).

Figure 7:
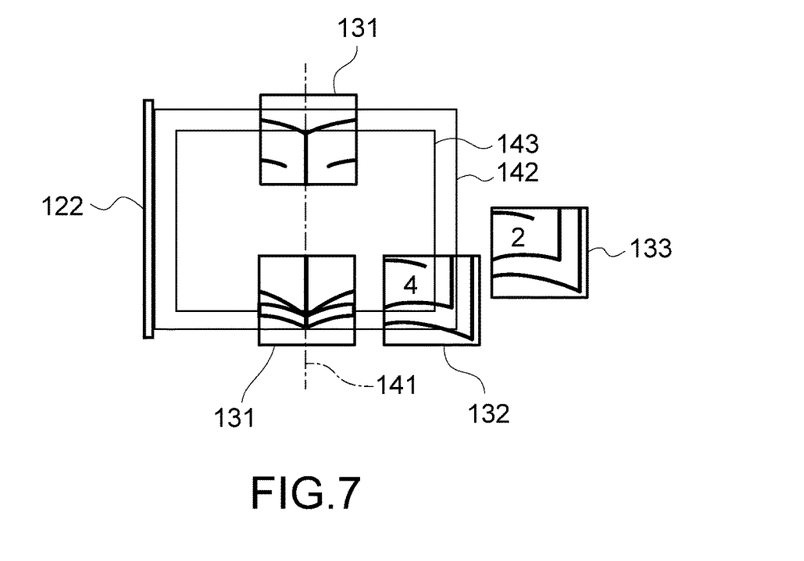
FIG. 7 schematically shows a page number image, viewpoint images, and guideline images displayed on the display device.

FIG. 7 schematically shows a page number image, viewpoint images, and guideline images displayed on the display device.

The display controller module 105 keeps on displaying the viewpoint images 131, the guideline images (the center line image 141, the limit line image 142, and the margin line image 143), and the page number image 132 (i.e., video images) on the display device 17a (Step S105 and Step S106). By the way, the display controller module 105 displays the page number image 132 of the document currently put on the platen 121 (i.e., page of pending scan), and further displays the previous page number image 133 outside the limit line image 142. The previous page number image 133 is a page number image of the document page previously scanned. As a result, a user may compare the page number value included in the current (pending) page number image 132 against the page number value included in the previous page number image 133, and visually confirm that scanned pages are not skipped.

The user inputs a request to output (store or abandon, etc.) the scanned image via the operation device 17. Then the image processor module 104 deletes the original images 130 and the viewpoint images 131 from the memory, and finishes displaying the viewpoint images 131. Meanwhile, the image processor module 104 does not delete the page number image 132 from the memory (Step S110). The display controller module 105 displays the undeleted page number image 132 as the previous page number image 133. As a result, the display controller module 105 further displays the previous page number image 133 on the display device 17a when displaying the page number image 132 of another page (next page) of the same document.

III. Example

Figure 8:
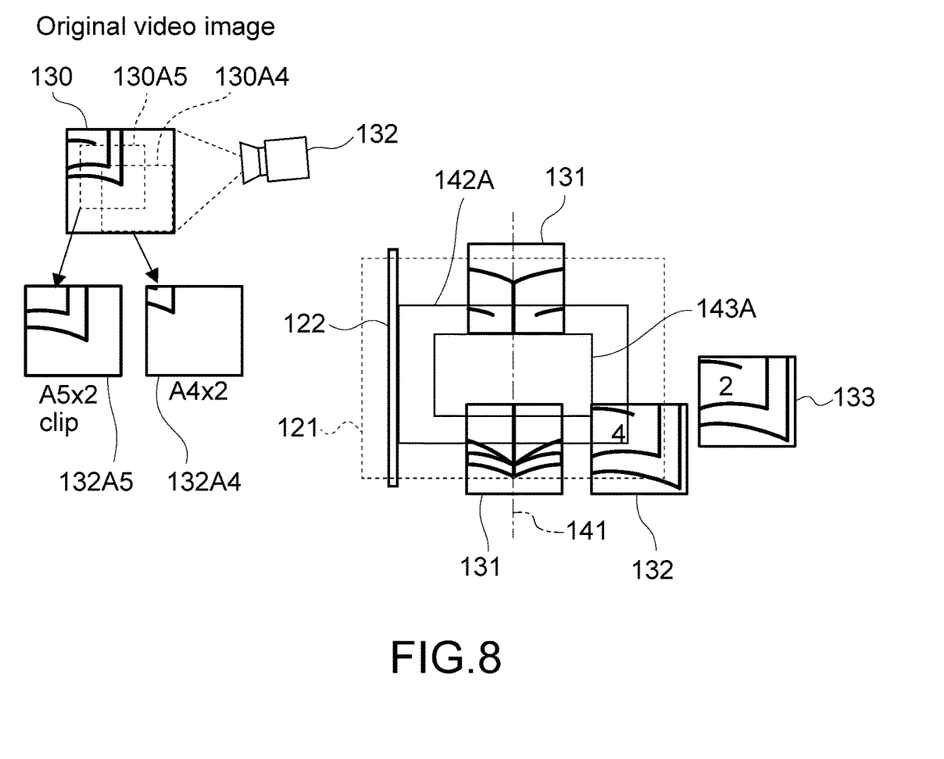
FIG. 8 schematically shows another example (where document is small) of a page number image, viewpoint images, and guideline images displayed on the display device.

FIG. 8 schematically shows another example (where document is small) of a page number image, viewpoint images, and guideline images displayed on the display device.

the image processor module 104 clips parts, which only include parts close to the edges of the documents, from the original images 130, and thus magnifies the clipped images to thereby generate the viewpoint images 131 (Step S104). Another display example will be described.

Where a document has the A4 double (A4×2) size, the image processor module 104 clips the part 130A4, which is relatively distant from the center point of the platen 121 in the diagonal direction, from the original image 130, and magnifies the clipped part 130A4 to thereby generate the page number image 132A4. Where a document has the A5 double (A5×2) size (smaller than A4 double (A4×2) size), the image processor module 104 clips the part 130A5, which is relatively closer to the center point of the platen 121 in the diagonal direction, from the original image 130, and magnifies the clipped part 130A5 to thereby generate the page number image 132A5.

Positions of the limit line image 142 and the margin line image 143 are variable depending on sizes of documents. Specifically, the limit line image 142A and the margin line image 143A (FIG. 8) of a document of a smaller size are located inner than the limit line image 142 and the margin line image 143 (FIG. 7) of a document of a larger size. As shown in FIG. 7 and FIG. 8, images showing the platen 121 and the home position of the line sensor 122 may be displayed with respect to the guideline images (the center line image 141, the limit line image 142, and the margin line image 143).

IV. Modification Examples

The viewpoint area is an area expected to include at least a part of an edge (outline) of a document where the document is put on the platen 121 with reference to a reference position on the platen 121. In the aforementioned embodiment, viewpoint areas are, where a document is put on the platen 121 with reference to the reference position on the platen 121 (i.e., such that the center point of the document aligns with the center point (reference position) of the platen 121), two areas including an area including the edge of the document (book) including the upper end of the center line (binding line of book) of the document, and an area including the edge of the document (book) including the lower end of the center line (binding line of book) of the document. To the contrary, the viewpoint areas may be, where a document is put on the platen 121 with reference to the reference position on the platen 121 (i.e., such that the center point of the document aligns with the center point (reference position) of the platen 121), four areas including the four corners of the document, three areas including any three corners of the document, two areas including two corners (typically diagonal corners), or one area including one corner. In other words, the viewpoint images 131 may include two viewpoint images including the upper end and the lower end of the center line of the document, respectively, and/or at least one viewpoint image including at least one of the four corners of the document.

Further, the viewpoint images 131 may include the two viewpoint images 131 including the upper end and the lower end of the center line of the document, respectively, and at least one viewpoint image 131 including at least one of the four corners of the document. Specifically, the image-capturing device 123 may capture the entire area of the platen 121, and the original image 130 may be used as the viewpoint images 131 as they are without being processed (i.e., flattening, clipping, and magnifying) by the image processor module 104. In this case, the original image 130, which includes the upper end and the lower end of the center line of the document, respectively, and all the four corners of the document, is used as the viewpoint image 131 as it is.

The type of documents is not limited to books. The document may be a plurality of name cards. For example, name cards are a lined on the platen 121 like tiles, and they are copied on one sheet of paper. In such a case, a user may confirm how the copied product will be and find some misaligned name cards before the start of copying.

V. Conclusion

To copy a book, there is known a scanner device that captures an image of open double pages (not covers but pages) facing the above by a high-resolution image-capturing device from the above and correct the image appropriately. However, such a scanner device is not often introduced in a typical office or another place since such a scanner device has a rather large footprint and is not used often. So, typically, a user copies a book with an MFP. When an MFP scans or copies a book, the MFP cannot automatically feed and scan the book with an ADF (Auto Document Feeder). So a user puts open pages of a book on a platen, and an MFP scans the open pages on the platen. Since platen is covered at the time of scanning, a user may not confirm whether or not the copy area is as expected, or whether or not an edge of the book is out of the limit line. Further, when the platen is pushed strong with the cover, the book may be moved off, and the binding line may be misaligned with (center may be misaligned) the horizontal scan direction of the platen. To the contrary, when the cover is not pushed strong enough, the binding line part, which is the center of the open book, may be blackened, or the resolution may be degraded. Further, a user has to replace the book from the MFP every open pages, and repeat confirmation of the copy result. As a result, a user may mistake the pages to copy. As a result, the same pages may be copied a plurality of times, or some pages may be skipped.

(1) To the contrary, according to the first and second embodiments, the image forming apparatus 10 includes: a platen 121 optically-transparent; a line sensor 122 configured to move below the platen 121 and optically scan the platen or a document on the platen 121; an image-capturing device 123 located below the platen 121 and configured to capture a viewpoint area 124, the viewpoint area 124 being at least a partial area on the platen 121 and being an area expected to include at least a part of an edge of a document where the document is put on the platen 121 with reference to a reference position on the platen 121; a display device 17a; and a controller circuitry 100 configured to display a viewpoint image 131 and a guideline image on the display device 17a, the viewpoint image 131 being an image obtained by capturing the viewpoint area 124 by the image-capturing device 123, the guideline image being an image showing the reference position, such that the guideline image overlaps the reference position in the viewpoint area 124 included in the viewpoint image 131. As a result, when the platen 121 is covered and a user cannot see the platen 121, the user may visually confirm the position of the document based on the positional relationship between the viewpoint image 131, which includes at least a part of an edge of the document, and the guideline image showing the reference position.

(2) According to the first and second embodiments, the guideline image includes the center line image 141, the limit line image 142, and/or the margin line image 143 showing a center line of the document, a limit line of the edge of the document, and/or a margin line showing a limit of content of the document. As a result, when the platen 121 is covered and a user cannot see the platen 121, the user may visually confirm whether or not the center line (binding line) of the document is misaligned with the center line of the platen 121, whether or not the document is within the edge limit line (optically readable limit), and whether or not content such as sentences of the document is within the margin line.

(3) According to the first and second embodiments, controller circuitry 100 is configured to generate the viewpoint image 131 by clipping an image obtained by capturing the viewpoint area 124 by the image-capturing device 123 depending on a size of the document and thus magnifying a clipped image, and display the viewpoint image. As a result, the viewpoint image 131, which is obtained by magnifying only the necessary part, is displayed. So it is easy for a user to see the image and visually understand the position of the document.

(4) According to the first and second embodiments, the viewpoint image 131 includes two viewpoint images 131 including an upper end and a lower end of the center line of the document, respectively, and/or at least one viewpoint image 131 including at least one of four corners of the document. In this manner, not by displaying an image of a plain sheet of a document (including no edge, no center line, or no corner), but by displaying the image including characteristic parts, it is easy for a user to visually understand the position or misalignment of the document.

(5) According to the first and second embodiments, the controller circuitry 100 is configured to move the line sensor 122 to a different home position depending on the size of the document. As a result, when a document is put on the platen 121 with reference to the reference position (center of the platen 121) of the platen 121, it is always possible to start scanning the document from an appropriate home position as the start position irrespective of the size of the document.

(6) According to the first and second embodiments, the controller circuitry 100 is configured to where the document included in the viewpoint image 131 displayed on the display device 17*a* is misaligned with the guideline image, receive an operation for relocating the guideline image with respect to the viewpoint image 131, the operation being input via the operation device 17, display the guideline image on a position, which is relocated with respect to the viewpoint image 131, in response to the operation, and relocate the line sensor 122 to a home position depending on the size of the document and a new reference position, the new reference position being a position which the relocated guideline image overlaps. In this way, without adjusting the position of the book by physically relocating the book, the home position of the line sensor 122 is temporarily relocated via the operation of the operation device 17. A user does not need to manually relocate a relatively heavy book or a relatively thick book, which is user friendly. Further, the home position may be reset every scanning within the moment that a user puts the next pages on the platen 121. Then a user may not feel inconvenient because the user does not need to wait for the reset of the home position (i.e., physical relocation of the line sensor 122).

(7) According to the first and second embodiments, the controller circuitry 100 is configured to output a scanned image, the scanned image being an image obtained by scanning the document put on the platen 121 by the line sensor 122, and output the scanned image, then delete the viewpoint image 131, and finish displaying the viewpoint image 131. As a result, a user may visually confirm that the document is at the correct position with reference to the reference position of the platen 121 until the scanning is completed. Further, the viewpoint image 131 is deleted at the timing when the viewpoint image 131 is not necessary anymore. So the memory is not too much occupied.

(8) According to the second embodiment, the image-capturing device 123 is configured to capture a page number area 125, the page number area 125 being an area expected to include at least a page number of the document where the document is put on the platen 121 with reference to the reference position on the platen 121, and the controller circuitry 100 is configured to further display a page number image 132 on the display device 17*a*, the page number image 132 being an image obtained by capturing the page number area 125 by the image-capturing device 123. As a result, a user may visually confirm the page number value included in the current page number image 132.

(9) According to the second embodiment, the controller circuitry 100 is configured to output a scanned image, the scanned image being an image obtained by scanning the document put on the platen 121 by the line sensor 122, and to output the scanned image, then to delete the viewpoint image 131, and not to delete the page number image 132, and to further display a previous page number image 133 on the display device 17*a* when displaying the page number image 132 of another page of the document. As a result, a user may compare the page number value included in the current (pending) page number image 132 against the page number value included in the previous page number image 133, and visually confirm that scanned pages are not skipped.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
   a platen optically-transparent;
   a line sensor configured to move below the platen and optically scan the platen;
   an image-capturing device located below the platen and configured to capture a viewpoint area, the viewpoint area being at least a partial area on the platen and being an area expected to include at least a part of an edge of a document where the document is put on the platen with reference to a reference position on the platen;
   a display device; and
   a controller circuitry configured to display a viewpoint image and a guideline image on the display device, the viewpoint image being an image obtained by capturing the viewpoint area by the image-capturing device, the guideline image being an image showing the reference position, such that the guideline image overlaps the reference position in the viewpoint area included in the viewpoint image.

2. The image forming apparatus according to claim 1, wherein
   the guideline image shows a center line of the document, a limit line of the edge of the document, and/or a margin line showing a limit of content of the document.

3. The image forming apparatus according to claim 1, wherein
   the controller circuitry is configured to generate the viewpoint image by clipping an image obtained by capturing the viewpoint area by the image-capturing device depending on a size of the document and thus magnifying a clipped image, and display the viewpoint image.

4. The image forming apparatus according to claim 2, wherein
   the viewpoint image includes
   two viewpoint images including an upper end and a lower end of the center line of the document, respectively, and/or
   at least one viewpoint image including at least one of four corners of the document.

5. The image forming apparatus according to claim 1, wherein
   the controller circuitry is configured to move the line sensor to a different home position depending on a size of the document.

6. The image forming apparatus according to claim 1, further comprising:
   an operation device, wherein
   the controller circuitry is configured to
      where the document included in the viewpoint image displayed on the display device is misaligned with the guideline image,
      receive an operation for relocating the guideline image with respect to the viewpoint image, the operation being input via the operation device, display the guideline image on a position, which is relocated with respect to the viewpoint image, in response to the operation, and relocate the line sensor to a home position depending on the size of the document and a new reference position, the new reference position being a position which the relocated guideline image overlaps.

7. The image forming apparatus according to claim 1, wherein
the controller circuitry is configured to
output a scanned image, the scanned image being an image obtained by scanning the document put on the platen by the line sensor, and
output the scanned image, then delete the viewpoint image, and finish displaying the viewpoint image.

8. The image forming apparatus according to claim 1, wherein
the image-capturing device is configured to capture a page number area, the page number area being an area expected to include at least a page number of the document where the document is put on the platen with reference to the reference position on the platen, and
the controller circuitry is configured to further display a page number image on the display device, the page number image being an image obtained by capturing the page number area by the image-capturing device.

9. The image forming apparatus according to claim 8, wherein
the controller circuitry is configured
to output a scanned image, the scanned image being an image obtained by scanning the document put on the platen by the line sensor,
to output the scanned image, then to delete the viewpoint image, and not to delete the page number image, and
to further display a previous page number image on the display device when displaying the page number image of another page of the document.

10. An information processing method executable by an image forming apparatus including
a platen optically-transparent,
a line sensor configured to move below the platen and optically scan the platen,
an image-capturing device located below the platen and configured to capture a viewpoint area, the viewpoint area being at least a partial area on the platen and being an area expected to include at least a part of an edge of a document where the document is put on the platen with reference to a reference position on the platen, and
a display device,
the information processing method comprising:
displaying a viewpoint image and a guideline image on the display device, the viewpoint image being an image obtained by capturing the viewpoint area by the image-capturing device, the guideline image being an image showing the reference position, such that the guideline image overlaps the reference position in the viewpoint area included in the viewpoint image.

11. The information processing method according to claim 10, wherein
the guideline image shows a center line of the document, a limit line of the edge of the document, and/or a margin line showing a limit of content of the document.

12. The information processing method according to claim 11, wherein
the viewpoint image includes
two viewpoint images including an upper end and a lower end of the center line of the document, respectively, and/or
at least one viewpoint image including at least one of four corners of the document.

13. The information processing method according to claim 10, further comprising:
generating the viewpoint image by clipping an image obtained by capturing the viewpoint area by the image-capturing device depending on a size of the document and thus magnifying a clipped image, and displaying the viewpoint image.

14. The information processing method according to claim 10, further comprising:
moving the line sensor to a different home position depending on a size of the document.

15. The information processing method according to claim 10, wherein
the image forming apparatus further includes an operation device,
the information processing method further comprises:
where the document included in the viewpoint image displayed on the display device is misaligned with the guideline image,
receiving an operation for relocating the guideline image with respect to the viewpoint image, the operation being input via the operation device;
displaying the guideline image on a position, which is relocated with respect to the viewpoint image, in response to the operation; and
relocating the line sensor to a home position depending on the size of the document and a new reference position, the new reference position being a position which the relocated guideline image overlaps.

16. A non-transitory computer readable recording medium that stores an information processing program executable by an image forming apparatus including
a platen optically-transparent,
a line sensor configured to move below the platen and optically scan the platen,
an image-capturing device located below the platen and configured to capture a viewpoint area, the viewpoint area being at least a partial area on the platen and being an area expected to include at least a part of an edge of a document where the document is put on the platen with reference to a reference position on the platen,
a display device, and
a controller circuitry,
the information processing program causing the controller circuitry of the image forming apparatus to:
display a viewpoint image and a guideline image on the display device, the viewpoint image being an image obtained by capturing the viewpoint area by the image-capturing device, the guideline image being an image showing the reference position, such that the guideline image overlaps the reference position in the viewpoint area included in the viewpoint image.

17. The non-transitory computer readable recording medium according to claim 16, wherein
the guideline image shows a center line of the document, a limit line of the edge of the document, and/or a margin line showing a limit of content of the document.

18. The non-transitory computer readable recording medium according to claim 17, wherein
the viewpoint image includes two viewpoint images including an upper end and a lower end of the center line of the document, respectively, and/or at least one viewpoint image including at least one of four corners of the document.

19. The non-transitory computer readable recording medium according to claim 16, wherein the information processing program further causes the controller circuitry of the image forming apparatus to:

generate the viewpoint image by clipping an image obtained by capturing the viewpoint area by the image-capturing device depending on a size of the document and thus magnifying a clipped image, and display the viewpoint image.

20. The non-transitory computer readable recording medium according to claim 16, wherein the information processing program further causes the controller circuitry of the image forming apparatus to:

move the line sensor to a different home position depending on the size of the document.

* * * * *